Aug. 25, 1936.   A. E. W. JOHNSON ET AL   2,052,302
DISK HARROW
Filed Jan. 2, 1936    4 Sheets-Sheet 1

Inventors
A. E. W. Johnson
and F. Mowry
By

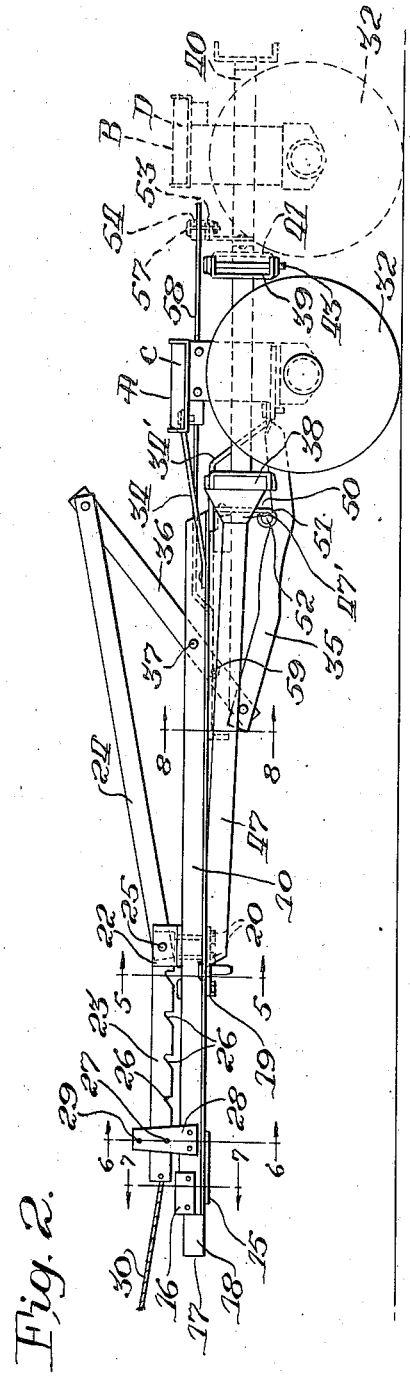

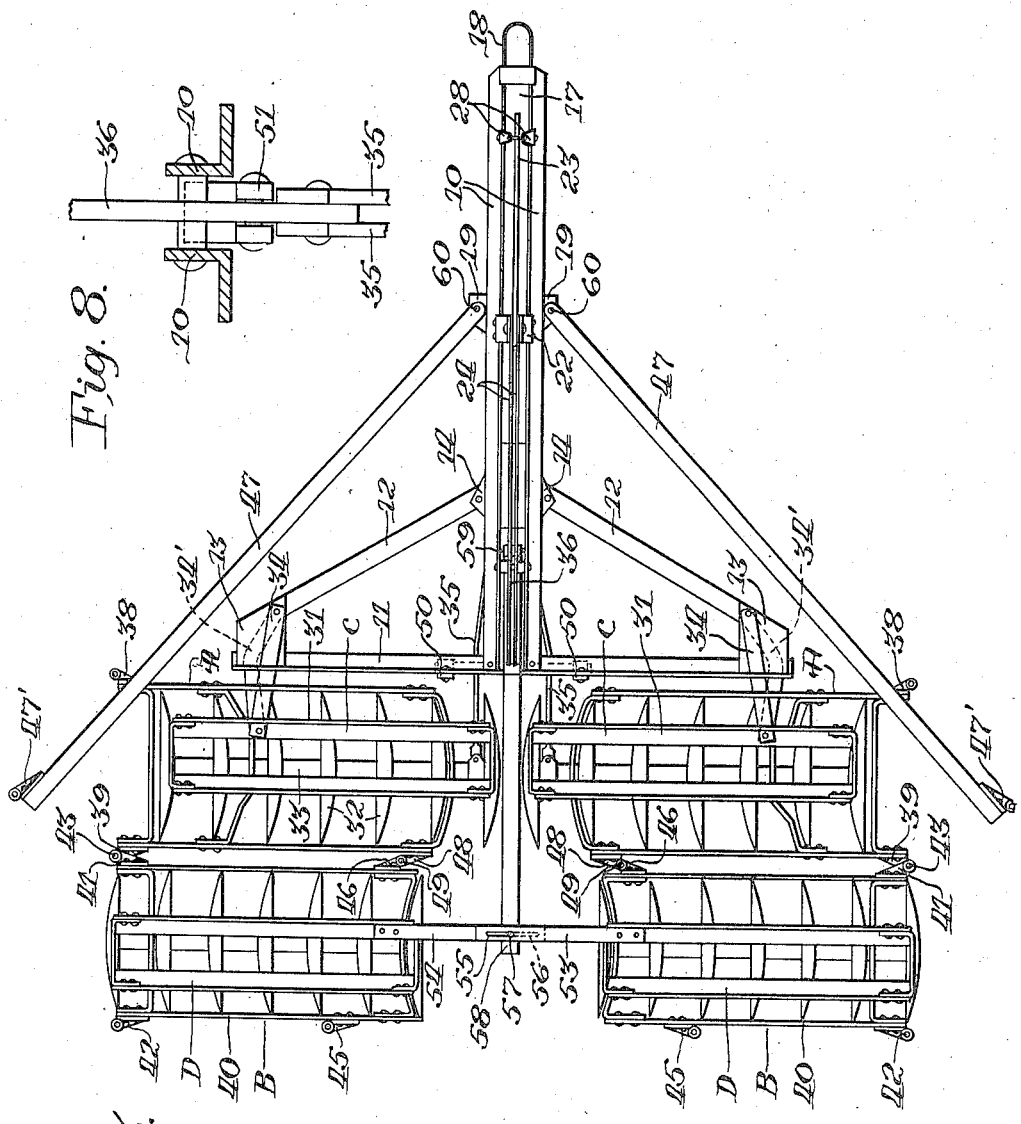

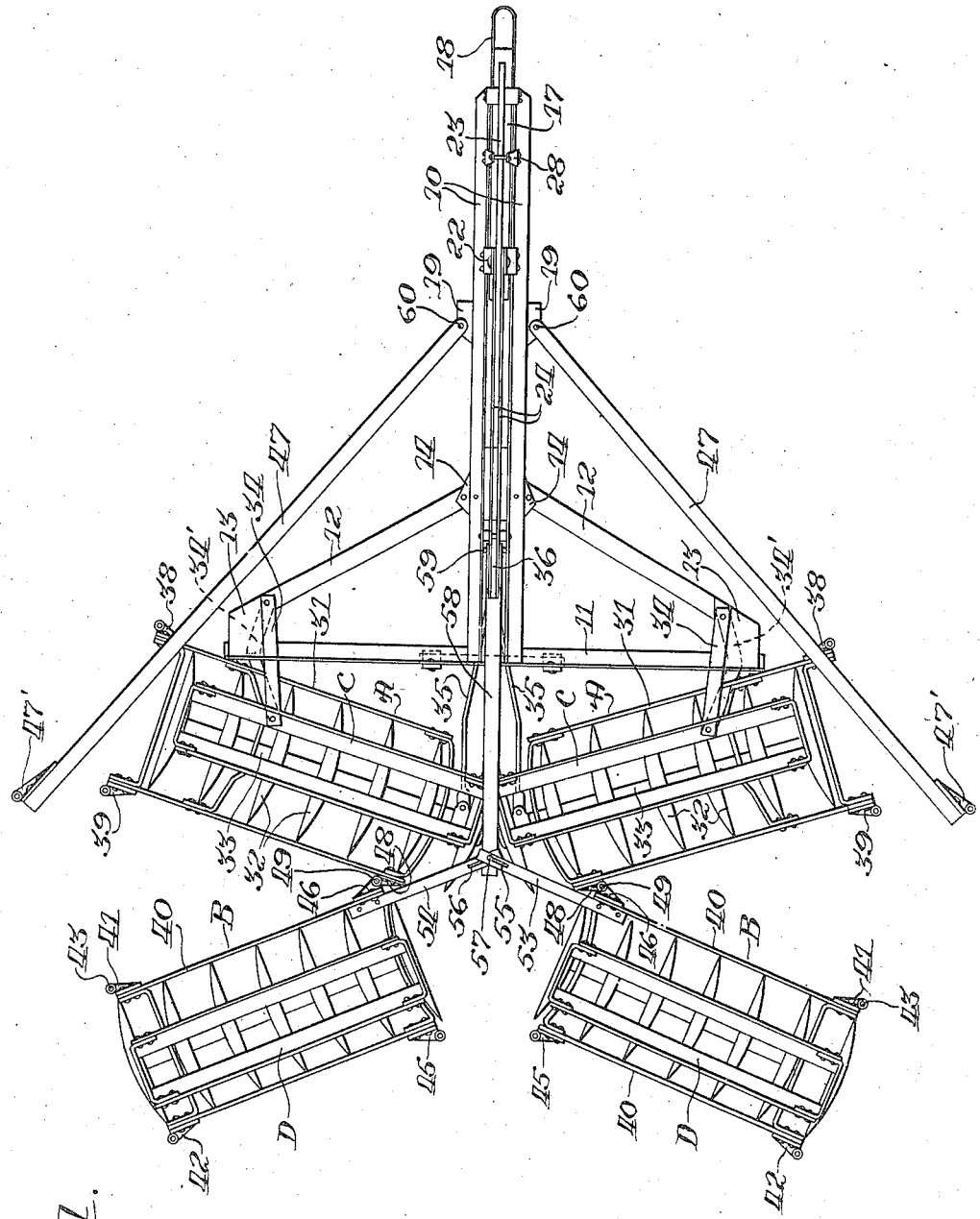

Patented Aug. 25, 1936

2,052,302

UNITED STATES PATENT OFFICE 2,052,302

DISK HARROW

Arnold E. W. Johnson, Chicago, and Edward Mowry, Rock Falls, Ill., assignors to International Harvester Company, a corporation of New Jersey Application January 2, 1936, Serial No. 57,264

22 Claims. (Cl. 55—83)

The present invention relates to a tractor drawn disk harrow and more specifically to what is known as a wide type disk harrow such as is disclosed in assignee's patent to E. Mowry 2,002,272, May 21, 1935.

The main object of the invention is to provide for conversion of a wide type disk harrow of sectional construction into a tandem disk harrow, so that the central gang structure of the wide type disk harrow can become the front gangs of the tandem disk harrow while the outer sections of the wide type disk harrow provide the rear gangs of the tandem disk harrow.

Another object of the invention is to provide folding of the outer sections of the wide type disk harrow rearwardly of the central sections of the wide type disk harrow to reduce the width of the harrow for transporting. A more specific object is to provide an improved wide type harrow construction including draft means with quick detachable connections to permit easy folding of said portions of the harrow.

Another object of the invention is to provide means for angling the rear tandem portion of the convertible wide type disk harrow when the front inner sections of the harrow are angled.

Another object of the invention is to provide means for exerting pressure on the inner gangs of the out-throw front sections of the harrow.

The above objects and others, which will be apparent from the detailed description to follow, are accomplished by providing a construction in which the outer sections of the wide type disk harrow construction are releasably secured to the inner gangs for pivoting on vertical axes and in which the draft means secured to the outer gangs are readily detachable, whereby the outer sections may be swung about vertical axes to positions behind the inner sections and secured to the inner sections for transporting.

The foregoing, as well as other objects which will appear from the description to follow, are obtained by the construction and arrangements of the parts hereinafter disclosed and claimed and illustrated by the accompanying drawings, wherein:

Figure 2 is a side elevation of the harrow shown in Figure 1, the dotted lines in this figure also showing the outer sections in folded transport position;

Figure 3 is a plan view of the harrow with the outer sections of the wide type harrow secured in trailing position;

Figure 4 is a plan view of the wide type disk harrow converted into a tandem disk harrow;

Figure 5 is a section taken on the line 5—5 of Figure 2;

Figure 6 is a section taken on line 6—6 of Figure 2;

Figure 7 is a section taken on line 7—7 of Figure 2; and,

Figure 8 is a section taken on line 8—8 of Figure 2.

Figure 1:
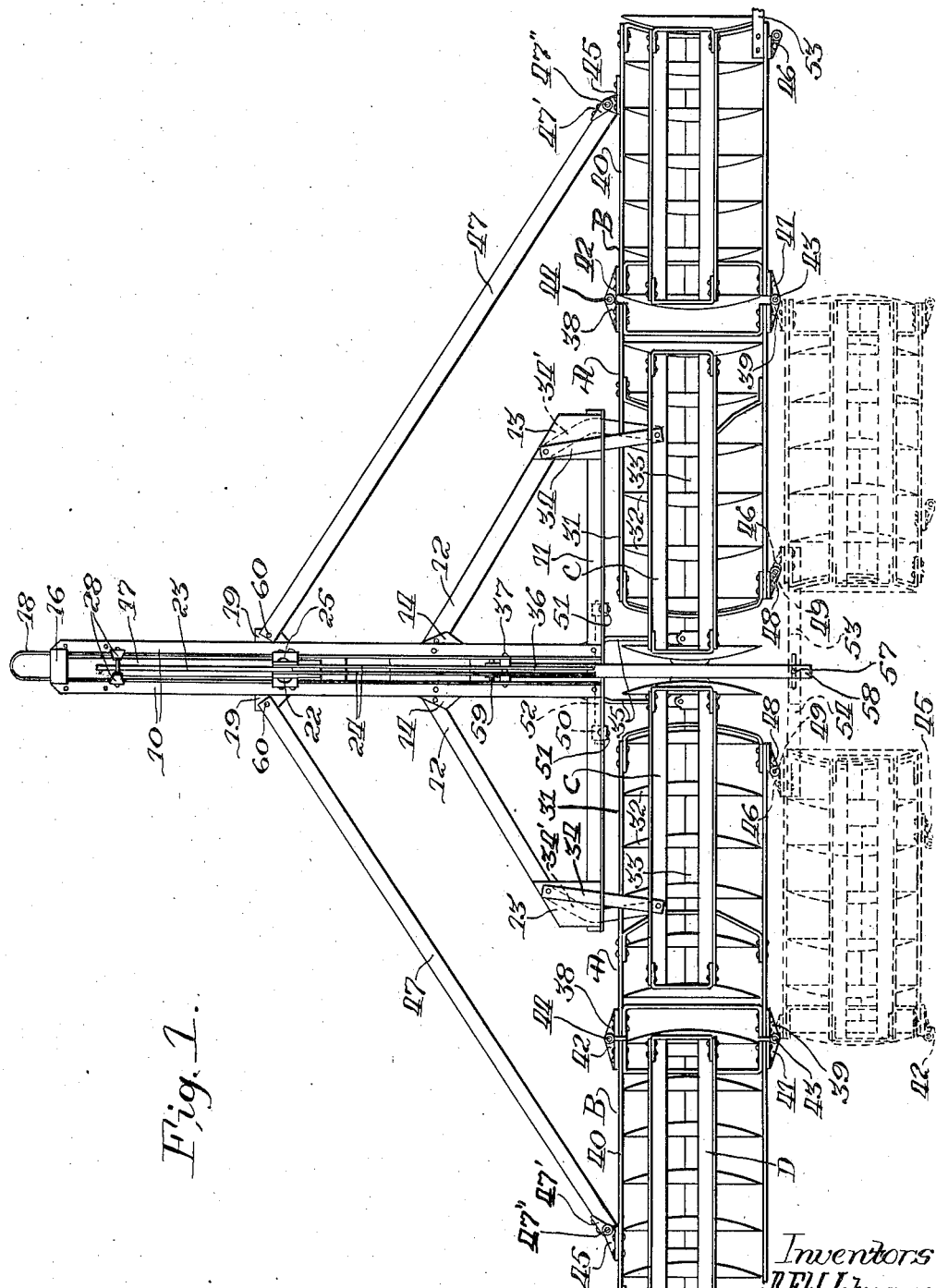
Figure 1 is a plan view of a wide type disk harrow in which the invention is embodied, the dotted lines showing the outer sections in collapsed, folded position.

The disk harrow illustrated is, generally speaking, of a somewhat conventional construction incorporating a well-known power angling feature. The angling of the disk gangs may be accomplished by draft power either in the fore or aft direction by proper manipulation of the locking mechanism. The draft frame of the disk harrow is similar in construction to the disk harrow disclosed in the Mowry patent above referred to, and this invention to be disclosed may be considered as a further development of the common subject matter of said previous patent. It consists of two spaced longitudinally extending angle bars 10, a transverse bar 11 to which the bars 10 are attached at their rear ends, and diagonal brace bars 12 connected to the outer ends of the bar 11 by gusset plates 13 and to a forward point on the bars 10 by a gusset plate 14. The forward ends of the bar, as shown in Figures 2 and 7, are connected by a bottom cross member 15 and an upper member 16. The draft frame constructed as described, forms a supporting or attaching means for the other parts of the disk harrow.

The main draft member 17 is slidably mounted between the angled bars 10, the rear ends of said member terminating in the position of adjustment shown in Figure 1, a short distance forwardly of the gusset plate 14. A clevis 18 is secured to the forward end of the draft member 17 for connecting the harrow to a draw-bar on the tractor and for applying power for angling the harrow.

Near the rear of the draft member 17, a plate 19 rigidly secured thereto extends laterally beyond the angle bars 10. Bolts 20, as best shown in Figures 2 and 5 which secure the plate 19 to the draft member, also secure an upper guide plate 21 in position. Said plate extends laterally over the top of the angle bars 10, said plates forming thereby a guide for the draft member and preventing displacement of said member. Two of the bolts 20 secure a U-shaped, upwardly extending member 22 to the draft bar 17. A forwardly extending latch bar 23 and rearwardly extending links 24 are pivotally secured to the member 22 by a pin 25.

The member 23 is provided with a plurality of spaced notches 26, which are adapted to engage a transverse pin 27, as best shown in Figure 6, carried by two upstanding brackets 28 secured to the angle bars 10 near their front ends. A stud 29 between brackets 28 above the bar 23 prevents upward displacement of said bar beyond the necessary movement to engage the different notches 26 with the pin 27. A flexible element 30 connected to the forward end of the bar 23 provides means extending to the operator of the tractor for lifting the bar 23 out of engagement with the pin 27. It will be noted that the rear side of the notches 26 are perpendicular to the bar whereby they remain latched on the pin 27 when pressure is exerted in a forward direction on the bar 23 by the draft caused by the tractor. The forward sides of the notches 26 are slanted or cammed whereby with the application of tension in a rearward direction on the bar 23, said bar moves rearwardly with the cam face moving over the pin 27.

The disk gangs are sectional, as previously pointed out, consisting of inner sections A and outer sections B. The frame structures 31 of the inner gangs A are of a conventional construction having depending supports of a conventional construction which support the transverse shaft which carry the disks 32 and the spacing spools 33 positioned therebetween.

The construction of the gang frame structures and the mounting of the disks thereon have not been shown in detail, as they may be of any conventional construction and do not in their detailed construction comprise any part of the present invention.

Each of the frame structures 31 is connected outwardly from its central point by a bar 34 with the gusset plate 13 of the draft frame. The bars 34 are slidably mounted in suitable slots in the rear angle 11. The bar 34 is pivotally connected to the frame structure 31 and to the draft frame with a limited lateral movement and a sufficient angular limitation to provide for angling the disk gangs. The bars 34 are pivoted at their rear end to the weight box structure C, as shown in Figure 1. Bars 34', as best shown in Figures 1, 2, and 4 are pivotally connected to the depending portion of the frame structure 31 substantially vertically below the points of connection of the bars 34 and to the same point of attachment on the gusset plates 13. By provision of the two bars 34 and 34', the frame structure 31 is mounted in an upright position and the tendency to tip forwardly or rearwardly is overcome.

The adjacent inner ends of the frame structures 31 are connected by the links 35 with the lower end of a lever 36 as best shown in Figure 2, pivoted intermediate its ends on a pin 37 carried by the draft bars 10 near the rear end thereof. The upper end of the lever 36 is pivotally connected to the link 24 previously referred to.

The frame structures 31 of the inner gangs A carry at their outer ends a bracket 38 on the forward side and a bracket 39 on the rearward side. The frame structures 40 of the outer gangs B carry corresponding brackets 41 at their rearward sides, and brackets 42 at their forward sides. Each of the brackets 39 is pivotally connected to the corresponding vertical bracket 41 by a vertical pin 43. Each of the brackets 38 is connected to the corresponding bracket 42 by a removable pin 44. At their outer ends each of the frame structures 40 is provided with a bracket 45 on its forward side and a bracket 46 on its rear side. The draft link 47 is pivotally connected to each bracket 45 and to the plate 19 previously referred to. On the rear end of each draft link 47 a bracket 47' is secured to the bracket 45 by a removable pin 47".

In the operation of the disk harrow as above described, the gangs A and B, being connected together at the rear side and at the forward side, operate as a single section, as best shown in Figure 1. This harrow is angled by the means described as in any harrow of this type. By releasing the lever 23 and applying draft to the member 17, the outer ends of the sectional gangs are pulled forwardly by the draft links 47, thus angling the harrow. At the same time the pressure is applied through the links 35 to the inner adjacent ends of the sectional gangs, whereby the gangs are angled without undue strain on their frame structures. The gangs are brought back into transverse alignment by applying rearward pressure to the draft member 17, the reverse operation taking place.

In wide type harrows, the over-all width of the harrow is such that it may not be readily transported, as the width is too great for the gates and roads over which it is to be operated. Also for storage purposes it is desirable to fold the harrow, whereby less lateral width is needed to house the implement. To fold the harrow, as illustrated in Figures 1 and 3, the draft links 47 are detached from the brackets 45 by removing the pivot pins 47" from the brackets 47' and 45. The pins 44 are also removed whereby the outer frame structures 40 are freed for pivoting about the vertical axes formed by the pins 43. The pins 44 and 47' may be replaced in either of the brackets from which they have been removed. Said frame structures are then swung around rearwardly about the vertical pivot axis formed by the pivot pin 43 to position substantially parallel to the forward gangs A, as shown in Figures 1 and 3. The brackets 46 previously referred to are then secured to properly located brackets 48 secured to the frame structures 31 of the inner gangs A at the inner rear corners. The brackets 46 and 48 are secured together by the pivot pins. The bars 47 are swung inwardly and laid across the frame structure of the inner gangs. To arrange the harrow for operation, the procedure is reversed, the outer frame structures 40 being swung around into position, whereby the pins 44 may be inserted and the draft members 47 attached.

In order to provide sufficient pressure on the inner disks of the gangs A an adjustable member 50 is secured to the rear frame member 11, as shown in Figures 1 and 2. Transversely supported in the adjustable supporting members 51 of the attachment 50 is a transverse bar 52 which engages the bow-shaped portion of the link 35, as the disk gangs are angled.

The main object of our invention which is to convert a wide type harrow previously described into a tandem disk harrow is accomplished in this manner. From the transporting position, as shown in Figure 3, the coupling pins 43 are removed from the brackets 39 and 41 and the gangs B angled, as shown in Figure 4. Inwardly extending angling bars 53 and 54 are secured to the frame structures 40. At their inner ends the angling bars 53 and 54 have slots 55 and 56 which engage the pin 57 of the angling link 58 extending forwardly, as shown in Figures 2 and 4 and pivotally connected to the levers 36 below the pivot pin 37 by a similar pivot pin 59, the end of the link 58 being slotted to allow the lever 36 to be pivoted therebetween in the slot. If necessary, the draft links 47 may be entirely removed by disconnecting the links 47 from the plate 19 by removing the pivot pins or bolts 60.

It is thus seen that the tandem disk harrow form has a set of gangs A with disks 32 set as out-throw gangs while the rear tandem section formed by the gangs B pivoted at 46 to the frame structure of the forward gangs A have their disks set to provide an in-throw gang similar to any tandem harrow. Suitable weight box structures C on the forward gangs A and likewise suitable weight box structures D on the rear gangs B of the tandem section may be used for carrying weights to provide the harrow disk with suitable penetration.

In angling this tandem harrow formed from the wide type, the lever 23 is released and draft applied to the member 17 by running the tractor forward. The outer ends of the gang C are pivoted about the links 34 and 34' as the inner ends of the gangs A are forced rearwardly by pressure applied through the links 35. In this manner the gangs are angled without undue strain on their frame structure. As the front gangs A are angled, the connecting link 58 pivoted on the lever 36 is moved rearwardly by the lever 37. The slots 55 and 56 and the angling bars 53 permit of this rearward movement of the connecting link 58 and as the harrow moves forwardly the gangs B are pulled into angle on the forward movement of the harrow. In a like manner, by backing, the harrow gangs may be straightened. It is to be understood that as the angling link 58 is pivoted midway between the link 35 and the respective pivot point 37 that the travel of the link 58 is one-half that of the travel of the links 35. Therefore, when the gangs are angled, as shown in Figure 4, and the gangs A take their position, the gangs B at their inner ends, where they are connected by the brackets 46 and 48 to the frame structure 31 of the gangs A, travel rearwardly the same amount as the gangs A. At the same time, the link 58 being connected to the members 53 and 54, the gangs B are pivoted about the pin 49 forwardly. This acts to offset the rearward movement of the links 35 which is twice that of the connecting link 58. In this manner, the rear gangs D are properly angled to cut out the furrow left by the front gangs A. Similarly the gangs A and B may be straightened by backing the tractor on releasing the locking link 23.

It is a simple matter to change the tandem harrow as shown in Figure 4, to the wide harrow as shown in Figure 1, by first detaching the links 53 and 54, swinging the gangs B forward and connecting them by the brackets 41 to the brackets 39 on the front gangs A, as shown in Figure 3. Then the pins 49 are removed and the gangs swung through an angle laterally and forwardly so that the brackets 42 may be connected to the brackets 38 by the pins 44, as best shown in Figure 1. The draft links 47 are then connected to the plate 19 and the brackets 45. With the construction as shown it is readily seen that one man may easily form a tandem harrow from a wide harrow and vice versa. Also, he may readily change the wide harrow into transport position by swinging the gangs B in the manner previously described and as shown in Figure 3. The gangs B are so connected to the frame structure 31 of the gangs A that it is even not necessary to use the pins 49 to retain the gangs B in their trailing position.

In the drawings and in the above specification the applicants have disclosed and described a particular embodiment of their improved wide type disk harrow which may be readily changed into a tandem harrow or collapsed for transporting purposes. As will be obvious to those skilled in the art, other arrangements can be provided with the laterally connected gangs B which have been previously described for properly forming a tandem harrow or for trailing the gangs B in transport position. It is also to be understood that material suitable to the stresses encountered in a wide type harrow or tandem harrow of this construction are to be used.

The preferred embodiment of the invention herein described is capable of certain modifications without departure from the scope of the invention to be defined in the following claims.

What is claimed is:

1. A field implement comprising a draft frame, transversely extending frame structures, two additional frame structures pivotally connected to the outer ends of said structures whereby said structures may be swung around to the rear of said first mentioned structures, means for connecting the outer ends of said additional frame structures to the inner ends of said first mentioned frame structures, means for disconnecting the first mentioned connection, and means for angling said structures relative to each other.

2. A field implement comprising a draft frame, a plurality of transversely extending frame structures comprising a plurality of separable sections, means for connecting some of said sections in tandem relation to others of said sections, and means for angling said sections with respect to each other including angling links connected to certain of said sections.

3. A field implement comprising a draft frame, two separable aligned transversely extending frame structures, means for connecting one of said frame structures in tandem to the other of said frame structures, and means for angling said frame structures with respect to each other including angling links connected to said sections.

4. A field implement comprising a draft frame, two frame structures in tandem relation and a plurality of angling links for angling said frame structures in tandem relation, means for connecting the rear frame to the front frame structure as an aligned transversely extending frame structure, and means for angling said aligned transversely extending frame structure, said means comprising some of the aforesaid angling links for angling the frame structures when in tandem relationship.

5. In a tractor drawn tillage implement comprising a draft means, transversely extending frame structures connected to said draft means, two additional frame structures pivotally connected to the outer ends of said structures whereby said structures may be swung around to the rear of said first mentioned structures, means for connecting the outer ends of said additional frame structures to the inner ends of said first mentioned frame structures, means for disconnecting the first mentioned connection, and means associated with said draft means and controllable from a distance for controlling the angle of the aforesaid frame structures relative to each other.

6. In a tractor drawn tillage implement comprising draft means, transversely extending frame structures connected to said draft means, two additional frame structures pivotally connected to the outer ends of said structures whereby said structures may be swung around to the rear of said first mentioned structures, means for connecting the outer ends of said additional frame structures to the inner ends of said first mentioned frame structures, means for disconnecting the first mentioned connection, and means associated with said draft means for controlling the angle of the aforesaid frame structures relative to each other while the implement is in operation.

7. In a tractor drawn tillage implement comprising a draft frame, two separably aligned transversely extending frame structures connected to said draft frame, means for connecting one of said frame structures in tandem to the other of said frame structures, and means associated with said draft frame and controllable from a distance for controlling the angle of the aforesaid frame structures relative to each other.

8. In a tractor drawn tillage implement comprising a draft frame, two separably aligned transversely extending frame structures connected to said draft frame, means for connecting one of said frame structures in tandem to the other of said frame structures, and means associated with said draft frame for controlling the angle of the aforesaid frame structures relative to each other while the implement is in operation.

9. The combination as set forth in claim 8, and means associated with said draft frame and controllable from a distance for controlling the angle of the aforesaid frame structures relative to each other.

10. In a tractor drawn tillage implement comprising a draft frame, two frame structures in tandem relation connected to said draft frame and operable connections for angling one with respect to the other, means for connecting the rear frame to the front frame structure as an aligned transversely extending frame structure, and means associated with said draft frame and controllable from a distance for controlling the angle of the aforesaid frame structures relative to each other.

11. In a tractor operated tillage implement comprising a draft frame, two frame structures in tandem relation connected to said draft frame including operable connections for angling one with respect to the other, means for connecting the rear frame to the front frame structure as an aligned transversely extending frame structure, and means associated with said draft frame for controlling the angle of the aforesaid frame structures relative to each other while the implement is in operation.

12. In a tractor drawn tandem tillage implement, flexibly connected tandem frames, comprising draft connections between said frames movable relative to each other and operable by the forward draft of the tractor for relatively adjusting said frames, and means carried by said tandem frames whereby said tandem frames may be converted into a wide type tillage implement, the frame structures of said wide type tillage implement being able to be angled with respect to each other by the aforesaid draft connections.

13. In a tractor drawn tillage implement, tandem frames and tillage gangs carried thereby, and relatively shiftable draft connections flexibly connected to said frames and gangs and forwardly and rearwardly movable relative to each other by the draft of the tractor for angularly adjusting said gangs in motion, means for connecting said gangs in trailing relationship to each other, means for laterally pivoting the rear frame of said tandem frames with respect to the front frame of the tandem connection, and means for securing the frames together, whereby a wide type tillage implement may be had.

14. In a tractor drawn tillage implement, flexibly connected tandem tillage gangs and draft connections between said gangs movable relative to each other through the relative draft movements of the tractor for relatively adjusting said gangs, and means on said tandem tillage gangs for connecting said gangs in a transversely extending relationship into a wide type tillage implement, whereby said wide type tillage implement may be angled through the relative draft movements of the tractor.

15. In a tractor drawn tillage implement, flexibly connected separable transversely extending tillage gangs in the form of a wide type tillage implement, draft connections between said gangs movable relative to each other through the relative draft movements of the tractor for relatively adjusting said gangs, and means on said transversely extending tillage gangs for connecting said gangs in tandem relationship into a tandem type tillage implement, whereby said tandem type tillage implement may be angled through the relative draft movements of the tractor.

16. In a harrow, front and rear frame structures, disk gangs carried thereby, means for straightening said rear gangs in backing and for setting angle on a forward pull, and means on said front and rear frame structures for connecting the rear frame structures in a transversely extending frame structure with the aforesaid front frame structures, and the means operable for straightening and angling said front and rear gangs operable to straighten and angle the aforesaid front and rear frame structures when connected in a transversely extending frame structure.

17. In a harrow, front and rear units, disk gangs on said units, means connecting said units, and means controllable from a distance for allowing the pull or push of the draft power to angle said front and rear units in tandem relation, and means for connecting said front and rear units in transversely extending relation whereby the aforesaid means controllable from a distance will permit said front and rear units when connected in transversely extending relationship to be angled by the pull or push of the draft power.

18. In a harrow, separable connected transversely extending units, disk gangs on said units, means connecting said units, and means controllable from a distance for allowing the pull or push of the draft power to angle said transversely extending units, and means for connecting said separable units into front and rear units in tandem relationship whereby the aforesaid means controllable from a distance will permit said transversely extending units when connected in tandem relationship to be angled by the pull or push of the draft power.

19. In a harrow convertible from a wide type to a tandem type, angularly adjustable disk gangs, means to which power is adapted to be applied for advancing said harrow, and means operatively related to said first mentioned means and to said gangs and controllable from a distance, whereby the draft power may be used to adjust the angles of said gangs when they are arranged as a tandem or a wide type harrow.

20. In a tractor disk harrow convertible from a wide type to a tandem type, front and rear units, draft members, means for pivotally mounting the rear units at their front inner ends to the rear inner ends of the front units for relative lateral movement to each other, and means connecting said front and rear units for angling the units relative to each other by the push or pull of the draft power.

21. In a tractor disk harrow convertible from a wide type to a tandem type, front and rear units, draft members, means for pivotally mounting the rear units at their front inner ends to the rear inner ends of the front units for relative lateral movement to each other, and means controllable from a distance for allowing said units to be angled by the pull or push of the draft power.

22. In a tractor disk harrow convertible from a tandem type to a wide type, front and rear units, draft members, means for pivotally mounting the rear units at their front inner ends to the rear inner ends of the front units for relative lateral movement to each other, and means connecting said front and rear units for angling the units relative to each other to transport position with the rear units trailing the front units, means for connecting the front outer ends of the rear units to the rear outer ends of the front units, means for disconnecting said rear units from their tandem connections, whereby the rear units may be swung laterally in transverse alignment with the front units in order to make a wide type disk harrow.

ARNOLD E. W. JOHNSON.
EDWARD MOWRY.